UNITED STATES PATENT OFFICE.

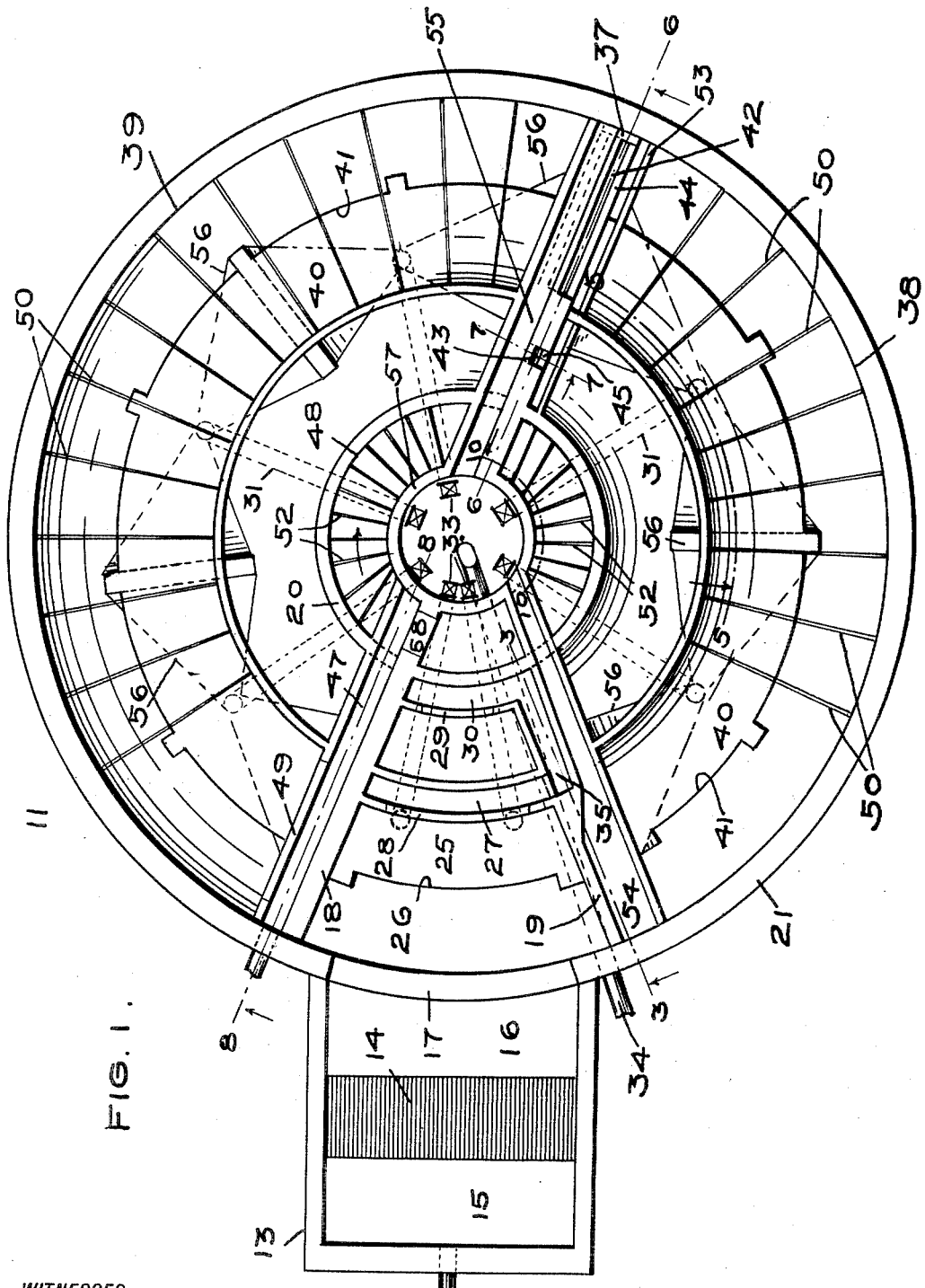

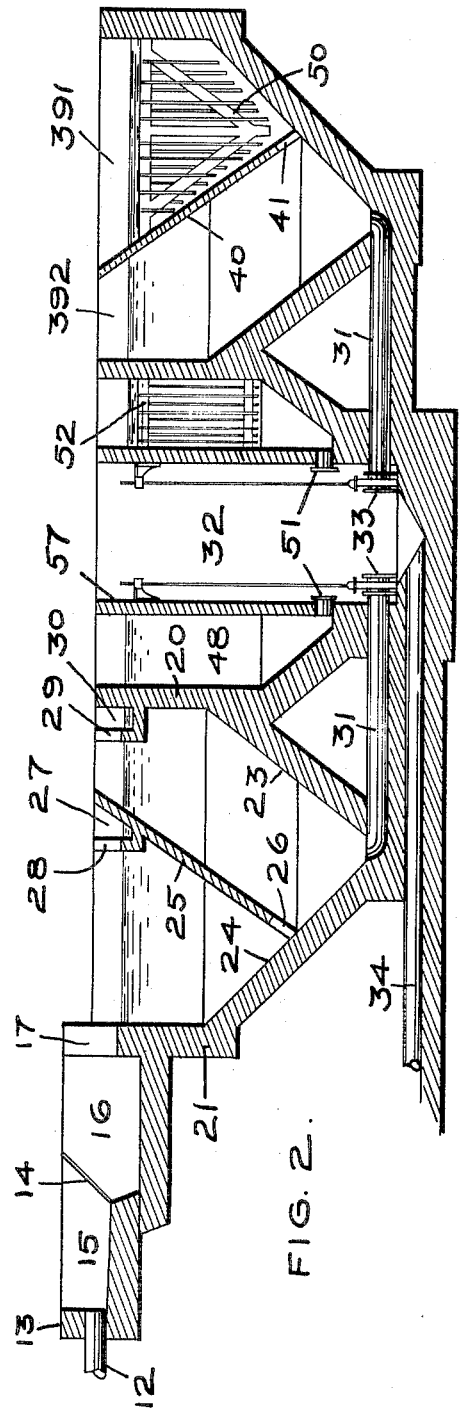
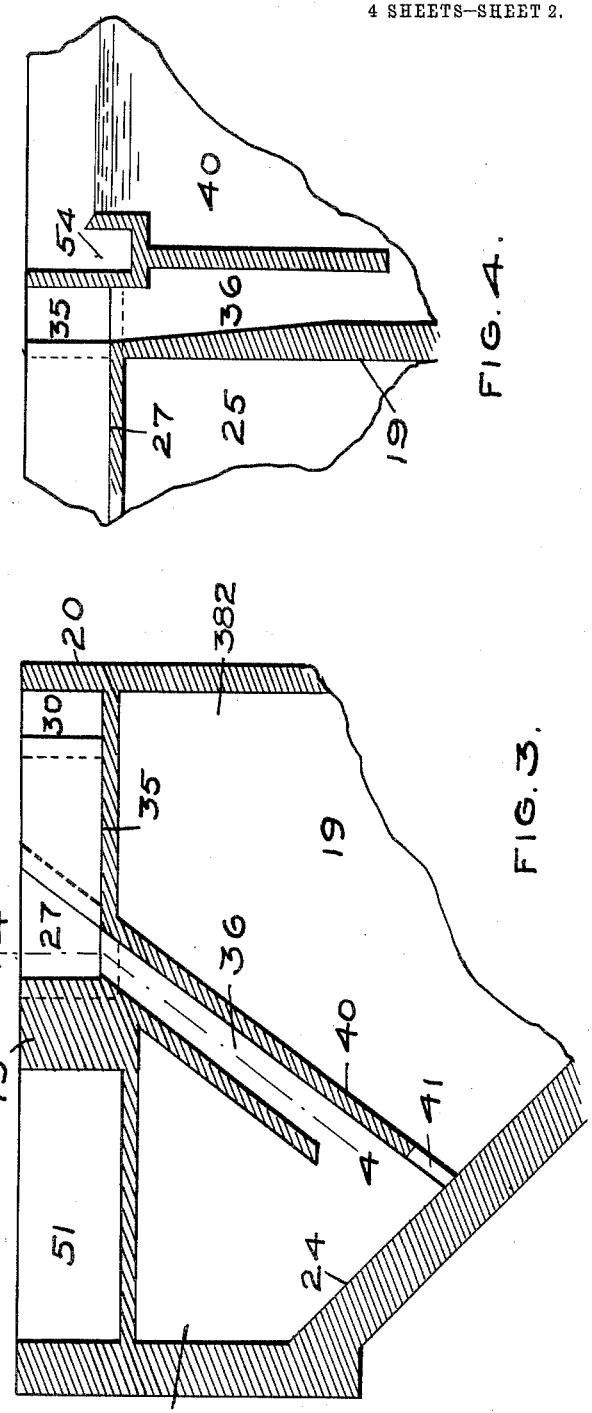

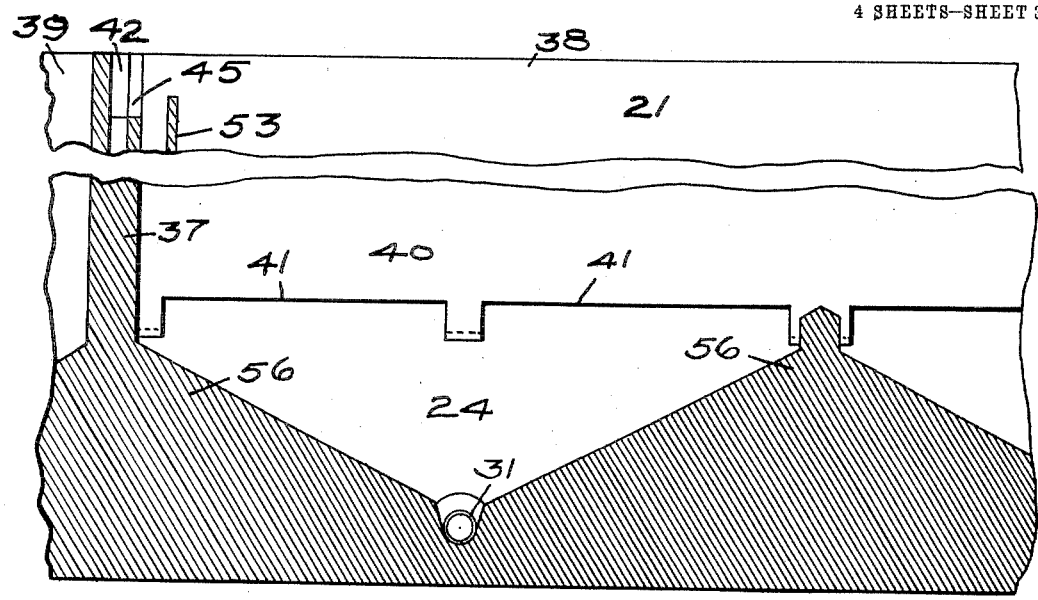
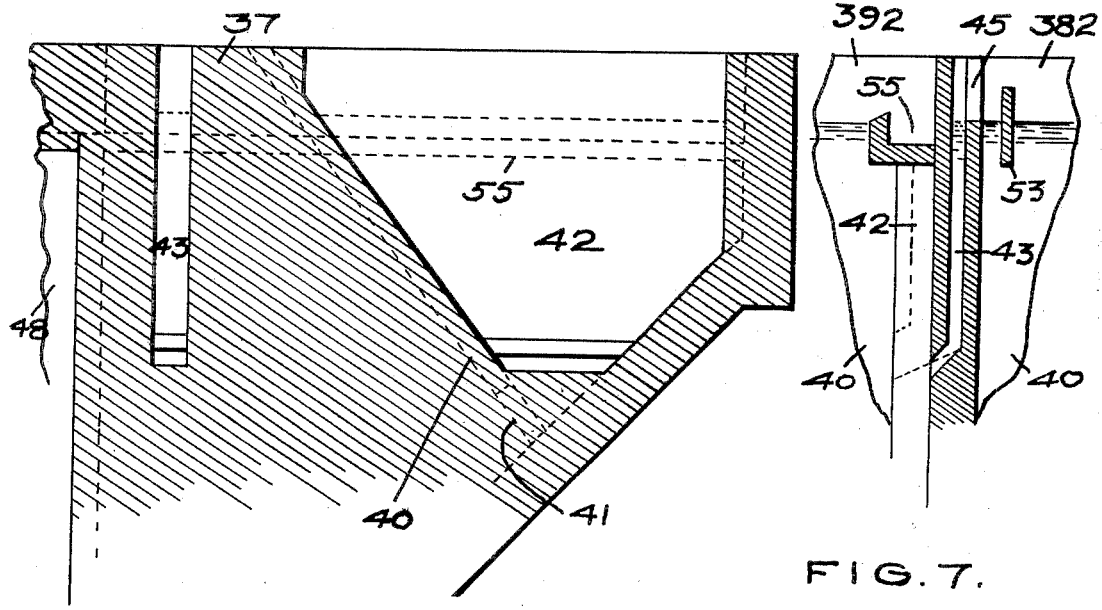

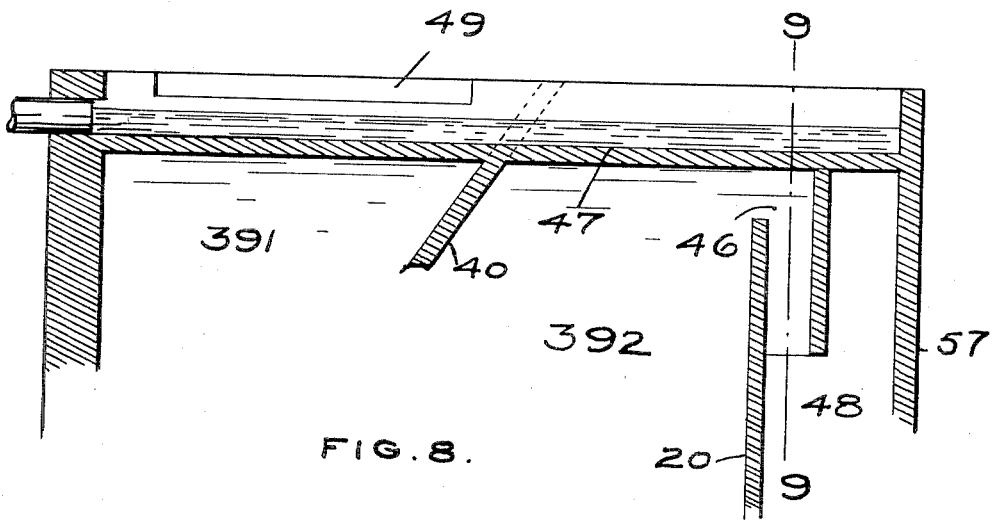
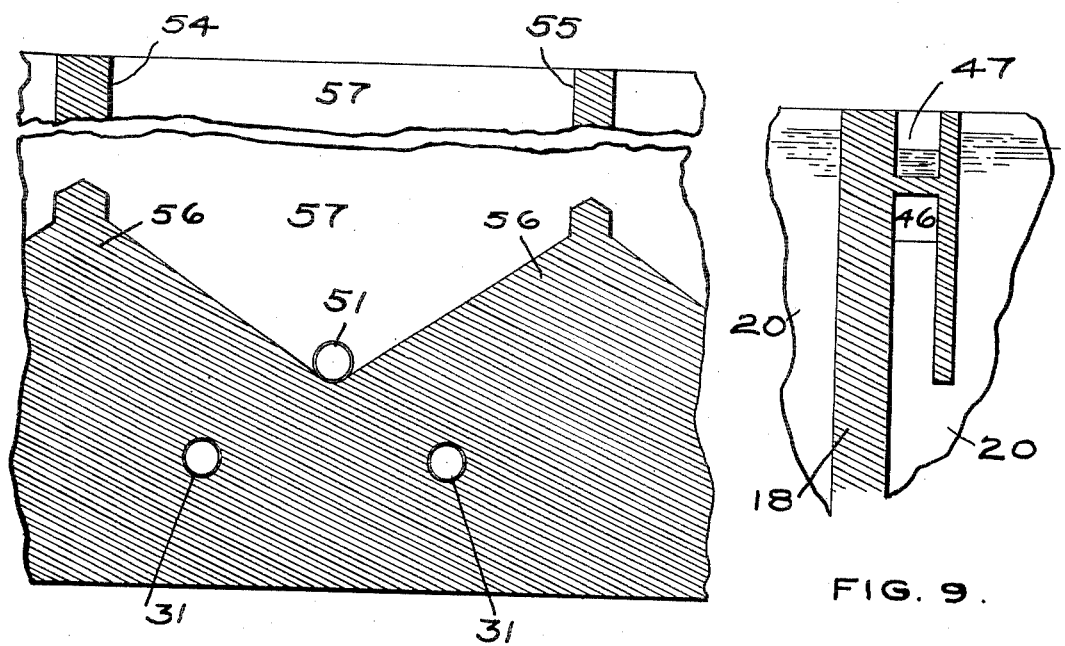

WILLIAM OWEN TRAVIS, OF HAMPTON, AND EDWIN AULT, OF BROMLEY, ENGLAND, ASSIGNORS TO STERILIZATION COMPANY, A CORPORATION OF NEW JERSEY.

METHOD OF PURIFYING SEWAGE OR THE LIKE.

1,076,721.   Specification of Letters Patent.   Patented Oct. 28, 1913.

Application filed September 13, 1910. Serial No. 581,805.

*To all whom it may concern:*

Be it known that we, WILLIAM OWEN TRAVIS and EDWIN AULT, subjects of the King of Great Britain, residing at Hampton, Middlesex county, and Bromley, Kent county, England, respectively, have invented certain Improvements in Methods of Purifying Sewage or the like, of which the following is a specification.

The objects of this invention are to remove the impurities in suspension in sewage and other impure liquids; to secure the deposit and collection of such impurities rapidly and completely, in the order of their grossness and specific gravity; to provide for such deposit and collection a tank divided into compartments with sloping bottoms, and means for controlling the flow from one compartment to another along said bottoms; to provide means for attracting from the sewage those impurities which exist in the form of colloids or solids in pseudo-solution; to provide means for removing the scum or solid matter which floats on the top of the liquid; to collect all of the solid matter in a common sludge pit from whence it may be led by a single pipe, while the liquid effluent escapes through another channel; to enable the sludge to be drawn off from any compartment at any time without stopping the operation of the tank; to thus keep the tank in constant action in a uniform undisturbed condition; to utilize the pressure of liquid contained in the tank to force out the sludge from the bottoms of the compartments; and to obtain other advantages and results as may be brought out in the following description.

Referring to the accompanying drawings, in which like numerals of reference indicate the same parts throughout the several figures, Figure 1 is a plan of a tank which can be employed in carrying out our invention; Fig. 2 is a vertical central section of the same, showing also the way in which certain pipes lead to and from the central pit for the solids; Fig. 3 is a radial vertical section on line 3—3 of Fig. 1, showing the passage of the liquid from the first section of the tank to the second section; Fig. 4 is a cross section of the same on line 4—4 of Fig. 3; Fig. 5 is a circumferential vertical section taken through the first part of the second section of the tank on line 5—5 of Fig. 1; Fig. 6 is a radial vertical section taken through the outlet from the first part of the second section of the tank on line 6—6 of Fig. 1; Fig. 7 is a cross-section of the same on line 7—7 of Fig. 1; Fig. 8 is a radial vertical section on line 8—8 of Fig. 1, through the outlet of the second section of the tank; Fig. 9 is a cross-section of the same on line 9—9 of Fig. 8, and Fig. 10 is a circumferential vertical section taken on line 10—10 of Fig. 1.

In said drawings, 11 indicates a tank by which our improved method of purification can be carried out. This tank is shown in the drawing as circular in form, although it may be of other shapes and we do not intend to limit ourselves herein to any particular form, as that will be greatly varied according to local requirements and other considerations. The tank may be constructed of concrete as we have shown, and may be reinforced as required according as it is more or less above the ground, or it may be built in any other suitable and well-known manner which will adapt it to our purposes.

The sewage is delivered to the tank through the pipe 12 and first enters a screening chamber 13 across which extends a screen 14 adapted to retain the coarser solid matter, such as rags and vegetable debris. These are held back by the screen 14 in the first compartment 15 of the screening chamber and from time to time removed by hand or mechanically. The liquid sewage passes through the screen 14 into the lower compartment 16 of the screening chamber and from thence flows through the weir 17 into the first section of the tank proper. This first section of the tank comprises that portion of the annular space between the outside wall 21 and intermediate wall 20 which is bounded by the radial partitions 18, 19, said portion constituting about one-eighth of the tank 11 circumferentially. This first section of the tank thus receives the liquid sewage from the screening chamber 13, and commences the separation therefrom of the solids which are carried by said liquid in suspension or pseudo-solution, as will next be described.

The annular portion of the tank between its outer circular wall 21 and similar intermediate wall 20 has its bottom transversely trough-shaped or V-shaped, as shown in Fig. 2, by reason of the outward incline or slope 23 from the intermediate circular wall 20 and an inward slope or incline 24 from the bottom of the wall 21. These sloping bottoms are to facilitate the collection of the sludge or deposited solids as the liquid sewage passes through the tank. The said first section of the tank is divided into outer and inner compartments by a circumferentially extending diaphragm 25, which is inclined downwardly outward at substantially the same angle as the inner slope 23 and engages the outer slope 24 between its upper and lower edges. At the lower edge of this diaphragm 25 is an opening 26 contiguous to the said bottom slope 24. At the upper part of said diaphragm 25, and at the side thereof next the screening chamber 13 is formed a channel 27 which has in its wall next to the outer compartment of the section a weir 28. This weir allows a portion of the sewage to escape from the outer compartment of the first section of the tank and the rest flows through the opening 26. The part which flows through the opening 26 enters the inner compartment of the section at its bottom and escapes over a weir 29 in the outer wall of a channel 30 upon the intermediate wall 20 of the tank. Obviously the capacities of the weir 29 and the weir 28 govern the proportions of liquid which pass directly through the outer compartment alone on one hand and through both compartments in succession on the other hand. In practice, about two-thirds of the liquid is caused to flow over the said weir 28 and one-third through the opening 26.

By the construction and consequent proportional flow thus described, the solid matter which is deposited from the liquid in the outer compartment onto the sloping side 24 of its bottom is carried by the flow of liquid through the opening 26 to the inner compartment, where it gathers with the solid matter deposited in said compartment in the lower converging portion of said inner compartment. The flow of a portion of the sewage through the opening 26 aids the action of gravity in the deposition and accumulation of the solid matter, and pipes 31 leading from said narrow bottom of the first section of the tank conduct the sludge or solid matter collected into a central pit 32. Valves 33 for each of said pipes enable the collected sludge or solid matter to be periodically drawn off, and from said central pit 32 the sludge or solid matter can escape by a passage 34. While the proportion of sewage flowing through the opening 26 may be varied as desired, we have found that about one-third gives good results in this first section of the tank. The proportions are preferably varied to suit the character of any particular class of sewage or contaminated liquid by carrying the relative lengths of the weirs, the sills of said weirs being on the same level.

The channels 27 and 30 of the first section of the tank open at their ends into a common channel 35 formed in the upper thickened portion of the partition 19, and from which common channel 35 a passage 36 leads downward to conduct the liquid sewage into the second section of the tank. This second section comprises the annular space between the outer and intermediate walls 21, 20 for the remaining seven-eighths of the circumference of the tank and is divided intermediate of its ends by a radial partition 37 into first and second parts 38 and 39. The second section of the tank is also divided circumferentially throughout both said parts into outer and inner compartments, 381, 382 and 391, 392, by a diaphragm 40 which is in substantially the same conical plane with the said diaphragm 25 of the first section. Said diaphragm 40 also provides at its lower edge openings 41 which enable the fluid to pass from the outer to the inner compartment, and the passage 36 by which the liquid comes from the first section enters the outer compartment of the second section.

The partition 37 of the forward end of the first part of the second section of the tank has in itself vertical passages leading downward from its top opposite the outer and inner compartments 381, 382 and marked on the drawings with reference numerals 42 and 43, respectively. In the upper edges of the walls of these passages which are next to said first part of the second section of the tank are formed weirs 44 and 45 which control the outlet or escape of liquid from said first part into the second part of the second section of the tank and determine the proportional parts of the liquid which shall pass through the outer and inner compartments of said first part, respectively. For example, eight-five per cent. of the liquid may flow directly through the outer compartment, and fifteen per cent. through the inner compartment also, to accelerate deposit of the solid matter.

The vertical passages 42 and 43 from the outer and inner compartments, respectively, of the first part of the second section of the tank discharge into the bottoms of the outer and inner chambers of the second part of the second section, respectively, and the flow of sewage continues through said second section until the radial partition 18 is again reached. Here the liquid in the inner compartment 392 of the second part of the second section of the tank passes by a submerged port 46 (see Figs. 8 and 9) in the intermediate annular wall 20, beneath the radial channel 47 formed upon the upper part of the partition 18, into the third section 48 of the tank. Said third section comprises the annular space between the intermediate wall 20 and the inner wall 57, and after passing around this section in the direction indicated by the arrow in Fig. 1, the effluent escapes therefrom over a weir 58 in the partition 18. This weir 58 and the weir 49 in the wall of the channel 47 over which the effluent from the outer compartment escapes thereinto, are of such relative size as to cause a greater proportion of the liquid to flow through the inner compartment of the second part of the second section of the tank than did in the first part of said second section. For example, seventy per cent. of the liquid may flow directly through the outer compartment 39¹ and thirty per cent. through the inner compartment 39² and third section 48 of the tank also, before reaching the channel 47. The effluent when finally received from both of said weirs into the said channel 47 can be led therefrom onto the land or to filters or for any other treatment which may be desired. If desired the effluents from the two weirs 58 and 49 could be kept separate.

While we have shown the second section of the tank divided into two parts, it could obviously be divided into any other number of parts in the same way, the purpose of division being to more perfectly fractionate the deposition of the solid matter and prevent any short circuiting of the flow of the liquid. Whatever the number of parts, however, the direct flow through the outer compartments is gradually decreased while the indirect flow through the inner compartments is gradually increased.

It will be noted that after passing over the weirs from one part of our improved tank to another the liquid is conducted downward by a passage to near the bottom of the succeeding part of the tank and the action of gravity in depositing the solids is assisted by the downward flow of that part of the liquid which passes into the inner compartment through the openings in the diaphragm. In this way the solids of higher specific gravity are separated by deposition in the most rapid manner practicable in the earlier period of flow and carried into the lower part of the inner compartment to be removed periodically as required, while the solids of lighter specific gravity are deposited in the later period of flow to be similarly removed.

We have found that a large though variable quantity of the impurities in the sewage exists in the form of colloids or solids in a pseudo-solution, and that said solids are attracted to all surfaces with which the liquid comes in contact and can be separated from the liquid in that manner. In order to attract these colloidal solids and to insure their deposition we provide a large area of surface by means of a number of rods or frames of wood or other solid substance hung vertically or nearly so in the liquid flowing through the outer compartments of the second section and through the final or third section. By these colloiders, which are marked with reference numeral 50 in the drawing, we provide the necessary extensive area of attraction, while owing to the vertical position of the colloiders, the accumulated solids can fall in the most direct manner and be carried into the lower part of the inner compartment. It will be understood that said colloiders can be of any suitable construction desired which presents a proper area of upright surfaces, and the particular construction shown is only for purposes of illustration.

The main object of the inner compartments of the sections of our improved tank is to collect the solids deposited in the outer compartments. The retention of these solids in said inner compartment, even for short periods, is attended by gas formation, the evolution of which is prevented from interfering with the deposition of solids in the outer compartments by the diaphragms 25 and 40, but such gas will constitute a disturbing element in the inner compartments, resulting in the re-conversion into pseudo-solution of some of the solids and to a greater or less extent in the saturation of the liquid with dissolved gases. It is therefore desirable that the final effluent from the inner compartment of the second section of the tank be subjected to a continuation of the process of dissolution in the supplementary or third section before being allowed to go out of the tank. Said third section has its bottom sloped conically toward the central pit 32, and passages 51 are provided for the removal thereinto of the deposited solid matter. Furthermore, said third or final section is provided with a large number of colloiders 52 arranged transversely of itself and the flow of the liquid therethrough, whereby the solids are subjected to further attraction and deposition from the effluent which has become fouled by the disturbance caused by the evolution of gases in the inner compartment of the second section.

In addition to the solids already referred to there are others carried in the sewage which owing to their lighter specific gravity or owing to their having bubbles of gas attached or entangled in their mass, float on the top of the liquid in the tank and several sections thereof in the form of scum. To prevent these solids from being carried forward, a trap or scum-board is arranged edgewise and partly projecting up out of the liquid, in front of the weirs, as shown at 53. Furthermore, at the rear end of each part of the second section of our improved tank is a scum gutter 54 or 55, respectively, into which the scum is periodically swept or removed from the surface of the liquid and conducted to the central sludge pit 32. These scum gutters extend across the tops of the third section of the tank, as shown, to empty into the pit 32.

Preferably, the trough-shaped bottom of the second section of our improved tank has transverse ridges 56, one between each two adjacent outlet pipes 31, the sides of each ridge sloping to the mouth of a pipe. Thus the bottom of the section is composed of inverted pyramidal pockets or funnels, each leading to a pipe 31, which further facilitates removal of the deposited sludge. The bottom of the third section of the tank may be similarly formed, and also the first section, if desired.

Each of the outlet pipes from the chambers of the tank to the central sludge pit 32 is provided with control means, such as the valves 33 we have shown, and thus any one can be opened at any time. This enables the sludge to be drawn off as necessary, and furthermore without in any way disturbing the operation of the tank when in action.

Briefly, the operation of our improved tank results in: (a) The separation of the grosser solid particles in the sewage in the well-known manner by means of a screen or the like, either fixed or movable, which is interposed in the flow of the sewage in such a way that the grosser solid particles are retained on or against the upstream surfaces of the screen whence they are from time to time removed by manual labor or mechanical means. (b) The separation of heavy solids chiefly of an inorganic nature, such as road detritus, by passing the sewage through the first section of the tank. (c) The separation of the lighter solids of the fine particulate matter and of the solids in the colloid state in a succeeding section or sections of the tank. (d) The collection and removal of the several dissociated solids from the various sections or compartments of the tank.

Having thus described the invention, what we claim is:

1. The hereindescribed process of purifying sewage or other liquid, consisting in supplying the liquid to a reservoir, allowing a portion of the liquid to escape directly from the upper part of the reservoir, conducting another portion of the liquid from the upper part of the reservoir downward nearly to the bottom of the reservoir and then upward through the reservoir and out at its upper part, conducting the liquid escaping from the first said reservoir to a second reservoir, and repeating in said second reservoir divisional flow of the liquid in the same manner as through the first reservoir but in different proportions.

2. The hereindescribed process of purifying sewage or other liquid, consisting in supplying the liquid to a sectional tank, allowing a portion of the liquid to escape directly from the upper part of a compartment of one section of said reservoir into a compartment of a succeeding section, causing another portion of the liquid in said compartment of the first section to flow from the bottom thereof into another compartment of said first section, conducting the liquid from said second compartment of the first section to the said compartment of the second section, and repeating the divisional flow of the liquid in the said second section in a different proportion from that in the first section.

3. The hereindescribed process of purifying sewage or other liquid, consisting in supplying the liquid to a sectional tank, allowing a portion of the liquid to escape directly from the upper part of a compartment of one section of said reservoir, causing another portion of the liquid in said compartment of the first section to flow from the bottom thereof into another compartment of said first section, conducting the liquid from the upper part of both said compartments of the first section separately to similar compartments of a second section, and repeating the divisional flow of the liquid in one of the compartments of the second section.

4. The hereindescribed process of purifying sewage or other liquid, consisting in supplying the liquid to a sectional tank, allowing a portion of the liquid to escape directly from the upper part of a compartment to one section of said reservoir, causing another portion of the liquid in said compartment of the first section to flow from the bottom thereof into another compartment of said first section, conducting the liquid from the upper part of both said compartments of the first section separately to similar compartments of a second section, and repeating the divisional flow of the liquid in one of the compartments of the second section in different proportions from that in the first section.

5. The hereindescribed process of purifying sewage or other liquid, consisting in supplying the liquid to a reservoir, allowing a portion of the liquid to escape directly from the upper part of the reservoir, conducting another portion of the liquid from the upper part of the reservoir downward nearly to the bottom of the reservoir and then upward through the reservoir and out at its upper part, conducting the liquid escaping from the first said reservoir to a second reservoir consisting of a plurality of parts, allowing a portion of the liquid to escape from the top of a compartment of one part of said second reservoir into a corresponding compartment of the next succeeding part, causing another portion of the liquid in said compartment of the first part to flow from the bottom thereof into another compartment of the same part of the second reservoir, conducting the liquid from the top of said second compartment of the first part into a corresponding compartment of the second part, and repeating the divisional flow of the liquid in said second part in different proportions from that in the first part.

6. The hereindescribed process of purifying sewage or other liquid, consisting in supplying the liquid to a compartment of a reservoir, subjecting the liquid to the action of colloiders in said compartment and allowing a portion of the liquid to escape from the upper part of said reservoir, and causing another portion of the liquid in said first compartment to flow from the lower part thereof into another compartment and then out of the reservoir independent of the first-mentioned portion.

7. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir independent of the first-mentioned portion, subjecting said last-mentioned portion of the liquid to the action of colloiders, and uniting the two said portions.

8. The hereindescribed process of purifying sewage or other liquid, consisting in supplying the liquid to a reservoir consisting of a plurality of parts, subjecting the liquid to the action of colloiders in a compartment of one part of said reservoir and allowing a portion of the liquid to escape from the top of said compartment into a second part of the reservoir, causing another portion of the liquid to flow from the bottom of said compartment into a second compartment of said first part of the reservoir, conducting liquid from said second compartment to the second part of the reservoir, and repeating in said second part the divisional flow of the liquid in different proportions from that in the first part.

9. The hereindescribed process of purifying sewage or other liquid, consisting in supplying the liquid to a reservoir, allowing a portion of the liquid to escape directly from the upper part of the reservoir, conducting another portion of the liquid from the upper part of the reservoir downward nearly to the bottom of the reservoir and then upward through the reservoir and out at its upper part, subjecting the liquid to the action of colloiders after such divisional flow, removing the scum or floating matter from the liquid, bringing together into a single chamber the results of said three separations of solids, and discharging the effluent.

10. The hereindescribed process of purifying sewage or other liquid, consisting in supplying the liquid to a reservoir, allowing a portion of the liquid to escape from the upper part of the reservoir, conducting another portion of the liquid downward in the reservoir toward its bottom and then upward again and out of an upper part of the reservoir independent of the first-mentioned portion, conducting the liquid escaping from the first said reservoir to a second reservoir, and repeating in said second reservoir divisional flow of the liquid in the same manner as through the first reservoir but in different proportions.

11. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of an upper part of the reservoir independent of the first mentioned portion, conducting one of said portions of liquid to a second reservoir, and repeating in said second reservoir divisional flow of the liquid in the same manner as through the first reservoir but in different proportions.

12. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of an upper part of the reservoir independent of the first-mentioned portion, conducting the liquid escaping from the first said reservoir to a second reservoir, repeating in said second reservoir divisional flow of the liquid in the same manner as through the first reservoir but in different proportions, conducting one of the portions of liquid from the second reservoir to a third reservoir, and repeating in said third reservoir divisional flow of the liquid in still another proportion.

13. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir, and subjecting said second portion to further treatment independent of the first-mentioned portion.

14. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir, and subjecting the said second portion independent of the first-mentioned portion to means for further removing solid matter from it.

15. The hereindescribed process for purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir, and again subjecting this second portion to divisional flow through a reservoir independent of the first-mentioned portion.

16. The hereindescribed process for purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir independent of the first-mentioned portion and again subjecting the second portion to divisional flow similar to that through the said reservoir but in different proportions.

17. The hereindescribed process of purifying sewage or other liquid, consisting in supplying the liquid to a reservoir, allowing a portion of the liquid to escape from an upper part of the reservoir, conducting another portion of the liquid downward in the reservoir toward its bottom and then upward again and out of the reservoir, uniting said portions, and subjecting them together to divisional flow similar to that through the said reservoir, but in different proportions.

18. The hereindescribed process of purifying sewage or other liquid, consisting in supplying the liquid to a reservoir, removing a portion of the liquid from an upper part of the reservoir, conducting another portion of the liquid downward in the reservoir toward its bottom and out of the reservoir, independent of the sludge discharge, and subjecting said second portion to further treatment independent of the first-mentioned portion.

19. The hereindescribed process of purifying sewage or other liquid, consisting in supplying the liquid to a reservoir, removing a portion of the liquid from an upper part of the reservoir, conducting another portion of the liquid downward in the reservoir toward its bottom and out of the reservoir independent of the sludge discharge, and subjecting said second portion independent of the first-mentioned portion to means for further removing solid matter from it.

WILLIAM OWEN TRAVIS.
EDWIN AULT.

Witnesses:
HERBERT OUTWIN SAXELBY,
ARTHUR SHONE.